455-503 AU 233 EX
FP8105 XR 3,838,278

United States Patent [19]

Duguay et al.

[11] 3,838,278

[45] Sept. 24, 1974

[54] OPTICAL SWITCHING NETWORK UTILIZING ORGAN ARRAYS OF OPTICAL FIBERS

[75] Inventors: Michel Albert Duguay; John Kirtland Galt, both of Summit, N.J.

[73] Assignee: Bell Telephone Laboratories, Incorporated, Murray Hill, N.J.

[22] Filed: Sept. 28, 1973

[21] Appl. No.: 401,633

[52] U.S. Cl. ............. 250/227, 250/199, 331/94.5 A
[51] Int. Cl. ........................... G02b 5/14, H04b 9/00
[58] Field of Search ........ 250/227, 199; 331/94.5 A

[56] References Cited

UNITED STATES PATENTS

| | | | |
|---|---|---|---|
| 3,408,656 | 10/1968 | Lamberts | 331/94.5 A |
| 3,590,248 | 6/1971 | Chatterton, Jr. | 250/199 |
| 3,781,092 | 12/1973 | Sussman | 250/227 |

*Primary Examiner*—James W. Lawrence
*Assistant Examiner*—T. N. Grigsby
*Attorney, Agent, or Firm*—M. J. Urbano

[57] ABSTRACT

In a hybrid opto-electronic switching system, electronic information pulses appearing on an input signal path are used to drive a laser which generates corresponding optical information pulses. Each of the optical information pulses is divided into a plurality *n* of optical sub-pulses each of which is coupled through lens means to separate ones of a plurality *n* of optical fibers in an organ array; i.e., an array of optical fibers in parallel with one another and cut to different lengths. Gating means, normally in an off-state, is interposed between the outputs of the fibers and *n* output electronic signal paths (e.g., subscriber lines). Because the fibers of the organ array introduce different transit time delays, the plurality of optical sub-pulses arrive at the gating means at different times. A control unit is utilized to connect the $m^{th}$ output signal path to the input signal path by driving the gating means into an on-state at a time when the optical sub-pulse on the $m^{th}$ fiber reaches the gating means. Also described are systems for connecting any one of *m* input signal paths to any one of *n* output signal paths. These systems can also be used in optical communications systems as well as in electronic systems.

11 Claims, 4 Drawing Figures

OPTICAL SWITCHING NETWORK UTILIZING ORGAN ARRAYS OF OPTICAL FIBERS

CROSS REFERENCE TO RELATED APPLICATIONS

The following applications were filed concurrently herewith: (1) U.S. Pat. Ser. No. 401,635 (M. A. Duguay Case 14) entitled "Optical Apparatus Utilizing Organ Arrays of Optical Fibers" and (2) U.S. Pat. Ser. No. 401,632 (V. E. Benes, M. A. Duguay Case 3—16) entitled "Time Slot Interchanger for Time Division Multiplex System Utilizing Organ Arrays of Optical Fibers."

BACKGROUND OF THE INVENTION

This invention relates to optical switching networks and, more particularly, to such networks which are compatible with either existing electronic transmission systems or future optical communications systems.

In telephone communications systems, the switching function in traditional step-by-step and crossbar systems is performed by arrangements of basic electromechanical switches, whereas in more recent electronic switching systems (ESS) this function is performed by purely electronic switches under computer program control. In electronic transmission systems of the present, information (e.g., voice or data) is carried either by cables or microwave links. In optical communications systems proposed for the future, information will probably be transmitted through optical fibers although in some applications atmospheric transmission is also feasible. Research into such optical systems has led to significant device development. In particular, the advent of low loss, low dispersion glass (silica) fibers, AlGaAs double heterostructure junction lasers which operate c.w. at room temperature, and silicon or germanium diode photodetectors, have given new direction and vigor to transmission system concepts. Our invention utilizes such basic components in optical switching systems which are compatible with either existing electronic transmission systems or with future optical transmission systems.

SUMMARY OF THE INVENTION

Our invention utilizes what shall hereinafter be termed an "organ" array of optical fibers; i.e., a plurality of fibers optically in parallel with one another. Each fiber is cut to a different length and the difference in length between functionally adjacent (i.e., length-wise consecutive) fibers is uniform. Preferably the fibers are arranged in a bundle with one end of each fiber terminated in an input plane and the opposite end of each fiber terminated in an output plane. The input and output planes need not be parallel to one another, and need not be "planar" in the geometric sense since the fiber ends may terminate on a curved surface or even in an incoherent array of points.

In a hybrid opto-electronic switching system in accordance with one illustrative embodiment of our invention, electronic information pulses appearing on an input signal path are used to drive a laser which generates corresponding optical information pulses. Each of the optical information pulses is divided into a plurality $n$ of optical sub-pulses each of which is coupled through lens means to separate ones of a plurality $n$ of optical fibers in an organ array. Gating means, normally in an off-state, is interposed between the outputs of the fibers and $n$ output electronic signal paths (e.g., subscriber lines). Because the fibers of the organ array introduce different transit time delays (proportional to their different lengths), the plurality of optical sub-pulses arrive at the gating means at different times. A control unit is utilized to connect the $m^{th}$ output signal path to the input signal path by driving the gating means into an on-state at a time when the optical sub-pulse on the $m^{th}$ fiber reaches the gating means. A detector converts the optical pulse to an electronic pulse on the $m^{th}$ output path.

Also described is an analogous arrangement in which the gating and detecting functions are separated at the output. In either case, however, a plurality of such arrangements in parallel can be utilized to switch any one of $m$ input signal paths to any one of $n$ output signal paths.

BRIEF DESCRIPTION OF THE DRAWING

Our invention, together with its various features and advantages, can be easily understood from the following more detailed description taken in conjunction with the accompanying drawing, in which.

DETAILED DESCRIPTION

In the following detailed description numerical parameters are utilized for the purposes of clarity of illustration and are not intended to be limitations upon the scope of the invention.

Figure 1:
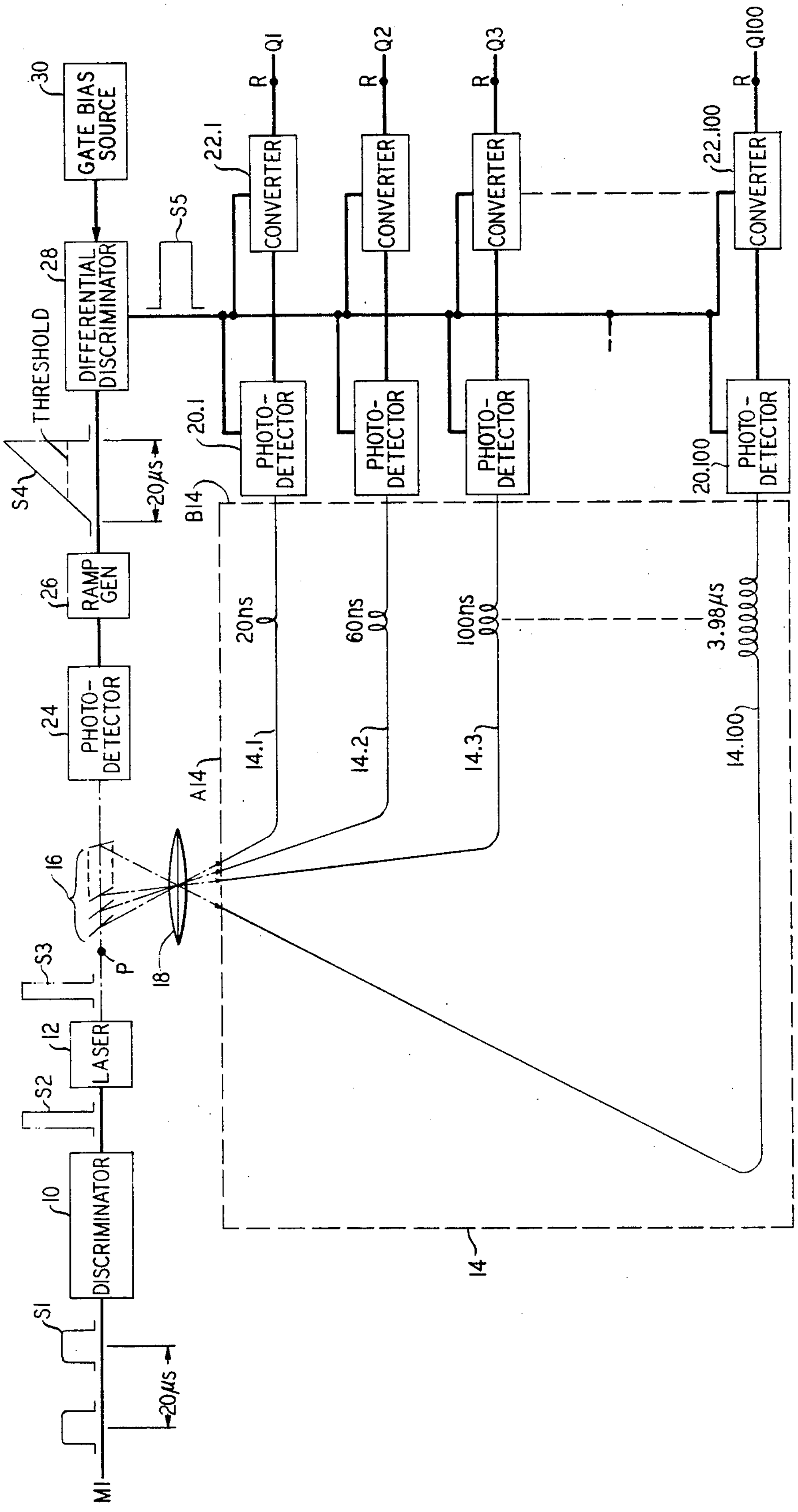
FIG. 1 is a block diagram of an optical switch in accordance with an illustrative embodiment of our invention.

Turning now to FIG. 1, consider that two-valued electronic pulses S1 arrive at discriminator-amplifier 10 every 20 μsec; i.e., at a 50 K-bit rate. For each electronic pulse S1, the discriminator-amplifier 10 generates a corresponding electronic pulse S2 of 10 nsec duration which is utilized to modulate a laser 12; e.g., an AlGaAs double heterostructure junction laser of the type described by I. Hayashi in U.S. Pat. No. 3,758,875 (Case 4) issued on Sept. 11, 1973. The laser 12 in turn emits at the same rate optical pulses S3 typically of duration 10 nsec and at a power level of about 200 mW. It is apparent, therefore,, that the laser 12 operates at a low duty cycle which means that the power demands upon it are relatively mild and well within the state of the art.

Each optical pulse S3 generated by laser 12 is then divided into a plurality of optical sub-pulses propagating along separate optical paths to an organ fiber array 14. More specifically, the optical pulses S3 are made incident upon a plurality $n$ of tandem beam splitters 16 which generate a plurality $n$ of optical sub-pulses from each pulse S3. These optical sub-pulses are focused through lens means 18 to the input plane A14 of organ array 14. Taking $n$ to be 100, each of the 100 optical sub-pulses is focused into a separate one of the 100 fibers 14.1, 14.2 . . . 14.100, each of which is cut to produce delays in increments of 40 nsec ranging from, respectively, 20 nsec to 3,980 nsec (about 4 $\mu$sec). By suitably designing the transmission and reflection characteristics of the beam splitters 16, each of the optical sub-pulses can be made to have nearly equal intensities.

It is intended that in making the differential delay of the fibers uniform, one skilled in the art will take into account differential delays introduced by other components in the switch, e.g., by the different path lengths through beam splitters 16. Note also that due to the power division introduced by beam splitters 16 and losses inherent in optical coupling, each of the sub-pulses in organ array 14 can be expected to have about 1 mW peak power.

In general, the $k^{th}$ fiber 14·$k$ ($1 \leq k \leq 100$) is connected to a photodetector 20·$k$, such as a silicon or germanium photodiode, the output of which is connected to the $k^{th}$ output signal path Qk through a digital-to-analog converter 22·$k$. The detectors 20 are all gated on simultaneously at predetermined times so that a signal pulse is transmitted to the desired output signal path and so that no signal pulse appears on any other output signal path. This gating function is controlled by the bias voltage applied from source 30 to a differential discriminator 28 which in turn is driven by a ramp voltage signal S4 from a ramp generator 26. The ramp generator 26 is triggered by a signal from a photodetector 24 which detects a sample of the optical input pulse S3 generated by laser 12. The differential discriminator 28 illustratively generates a 40 nsec pulse S5 which is connected to each of the photodetectors 20 and converters 22.

In more specific terms the operation of our invention can be understood as follows. For each pulse S3, beam splitters 16 and organ array 14 produce a plurality of sub-pulses on different paths (fibers) which arrive at output plane B14, and hence at detectors 20, at different times (due to the different lengths of the fibers). The detectors 20, which are normally in an off-state, act as a "shutter" or gating means which is opened when the pulse corresponding to the desired output path arrives at plane B14. The opening of the gating means at this predetermined time is effected by the arrival of control pulse S5, the timing of which is determined by the threshold level set by gate bias source 30. The threshold level is itself priorly set by the CPU as a function of, for example, the called telephone number dialed by the calling party. Illustratively, the higher the threshold level the later in time the gating means is opened which in turn connects the input path M1 to a higher numbered output path.

In this regard, it will be recognized that the optical switch of FIG. 1, as well as the switch of FIG. 2 to be hereinafter described, is asynchronous. That is, pulses on the input path, although arriving at varying times, automatically open the optical switch (via ramp generator 26 and discriminator 28) without the need for a clock.

Moreover, it should be noted that, due to the differential delay introduced by organ array 14, pulses will arrive at the output paths Q at different times depending on the fibers from which they emerge. Where desired, therefore, complementary electrical delay lines, for example, can be inserted between the photodetectors 20 and the output paths Q to compensate for the differential delay so that the total delay for each path from point P (prior to beam splitters 16) to each point R (at the output paths Q is nearly the same.

In the embodiment of FIG. 1, the entire 20 $\mu$sec interval between input signal pulses in the 50 K-bit stream is not utilized. That is, since the maximum delay introduced by array 14 is about 4 $\mu$sec, only about 20 percent of the available 20 $\mu$sec interval is utilized. It is clear, therefore, that this switching arrangement of 100 fibers could be utilized to handle a higher bit rate (e.g., up to a 250 K-bit rate). Two alternatives are possible: (1) because the pulses generated by laser 12 are 10 nsec in duration, the differential fiber delay can be 40 nsec and thus reduce the need for high precision gating, and (2) since the input pulse period is 20 $\mu$sec, the arrangement of FIG. 1 could employ 500 fibers in organ array 14 to switch the input signal path M1 to any one of 500 output signal paths.

As shown in FIG. 1, the longest fiber 14·100 in organ array in 14 has a delay of about 4 $\mu$sec. This fiber would, therefore, be approximately 800 meters long in a case where laser 12 generated pulses at a wavelength of 0.9 $\mu$m and the fibers are silica (index of refraction of about 1.5). It is important to note that 800 meters of silica fiber of 10 $\mu$m diameter would weigh only about 0.2 grams and, when suitably wound, could occupy a volume of about 0.1 $cm^3$.

Figure 2:
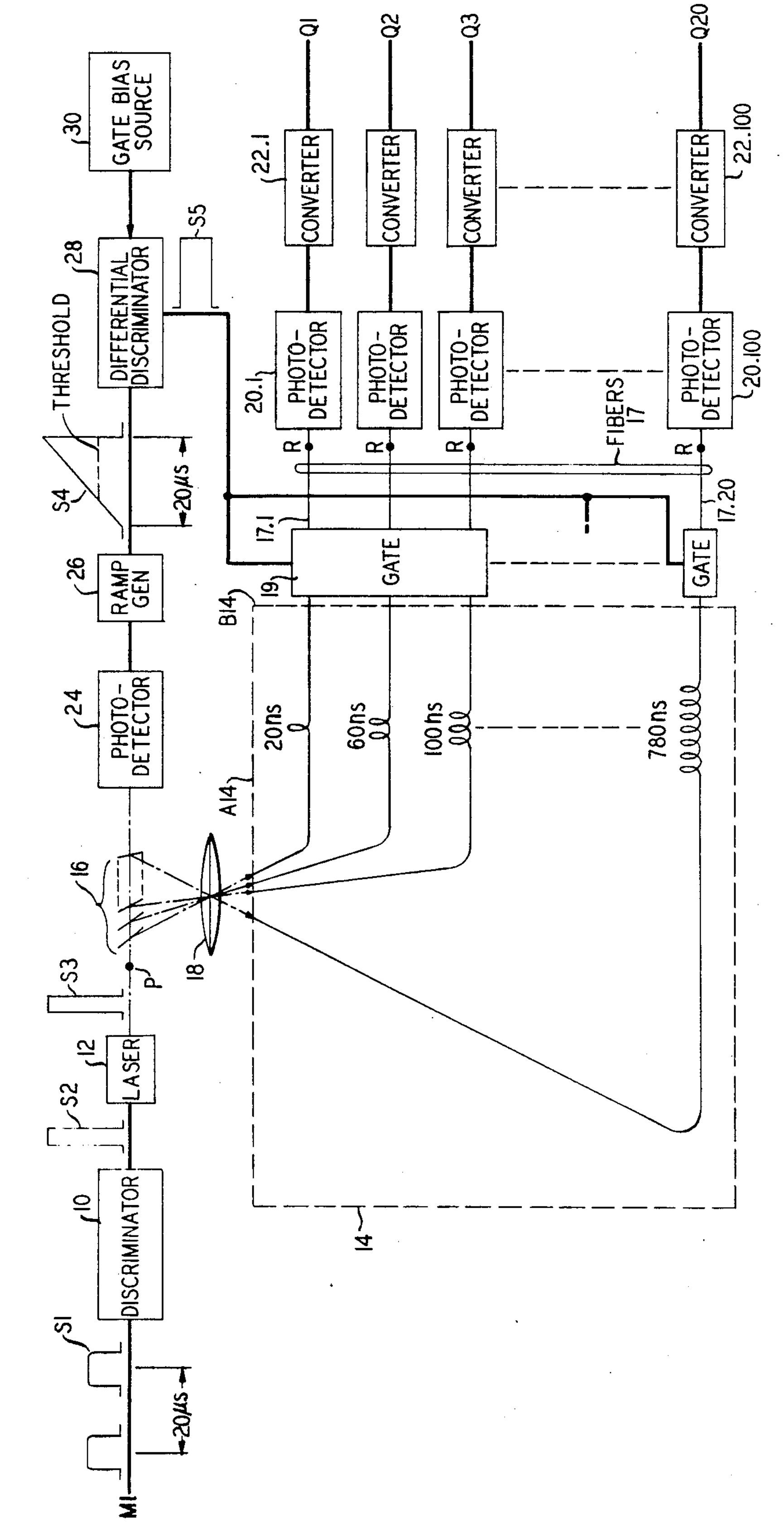
FIG. 2 is a block diagram of an optical switch which separates the gating and detecting functions at the output in accordance with another embodiment of our invention.

Another embodiment of our invention shown in FIG. 2 is broadly similar to the optical switch shown in FIG. 1 except that at the output the gating and detecting functions are separated from one another. Thus, the output of each of the fibers of organ array 14 is coupled to an optical gate 19 which is interposed between the output plane B14 of array 14 and a photodetector 20. Coupling between the gates and photodetectors is by means of optical fibers 17, for example. As shown, the gates 19 are driven by a 40 nsec pulse generated by differential discriminator 28. Illustratively, each gate 19 comprises a reverse-biased p-n junction double heterostructure AlGaAs phase modulator disposed between a pair of crossed polarizers as described by F. K. Reinhart in U.S. Pat. No. 3,748,597 (Case 2) issued on July 24, 1973. The actual gating voltage is derived in the same manner as in FIG. 1. The discrimination available in this type of gate permits the input signal path to be switched into approximately 20 output paths. In addition, it would be desirable to utilize approximately four of such gate devices in parallel in order to achieve adequate aperture. But, since these devices are intrinsically very fast, this type of arrangement does not introduce a serious capability problem.

Alternatively, where picosecond gating times are desired, the gate 19 may comprise a medium (e.g., $CS_2$ or fused quartz) in which birefringence can be optically induced and which is disposed between a pair of crossed polarizers. This type of gate is described by M. A. Duguay in U.S. Pat. No. 3,671,747 (Case 10) issued on June 20, 1972. In this case the combination of the photodetector 24, ramp generator 26 and differential discriminator 28 would be replaced by a laser source of high intensity, picosecond duration, optical control pulses made incident on the medium of the gate. This source could also be triggered by the optical pulses S3, in a manner now well known in the art.

In either case, it is possible that two or more of the gates 19 of FIG. 2 may be integrated into a unitary gate adapted to receive sub-pulses from two or more fibers.

As with the embodiment of FIG. 1, due to the differential delay introduced by the organ array 14 of FIG. 2, pulses will arrive at the output paths Q (i.e., at photodetectors 20) at different times depending on the fibers from which the pulses emerge. Where desired, therefore, a complementary organ array of optical fibers can be inserted between the optical gates 19 and the photodetectors 20 to compensate for the differential delay so that the total delay for each path from point P (prior to beam splitters 16) to each point R (at the inputs of photodectors 20) is nearly the same. The complementary organ array could readily be formed from fibers 17 suitably cut to provide complementary delays, e.g., fibers 17.1, 17.2, 17.3 . . . 17.20 would have delays of 20 nsec, 60 nsec, 100 nsec . . . 780 nsec, respectively.

Figure 3:
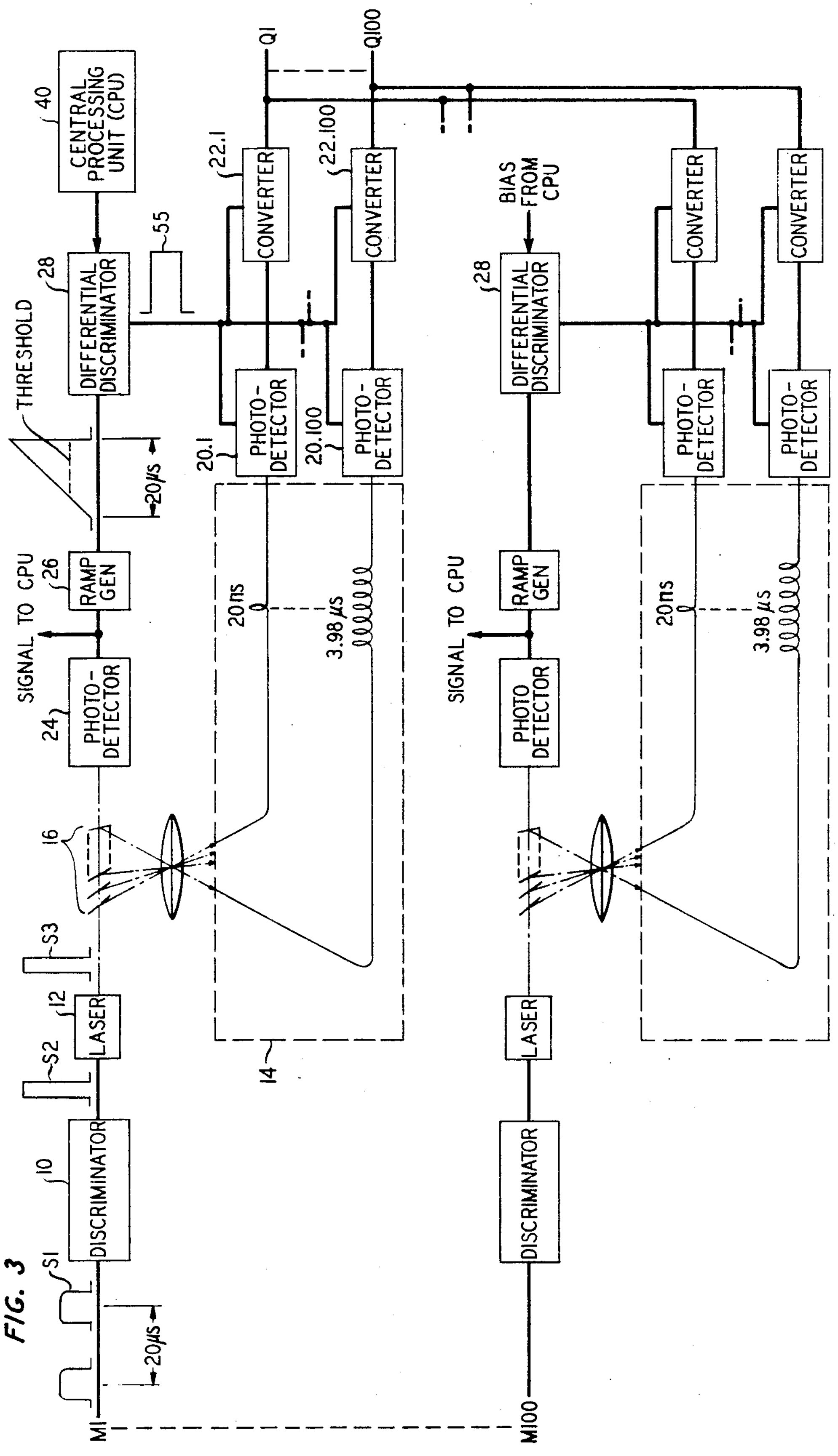
FIG. 3 is a block diagram of an arrangement of optical switches (of the type depicted in FIG. 1) adapted to switch any one of $m$ input signal paths to any one of $n$ output signal paths.

From a system standpoint, a plurality of the optical switches of the type shown in either FIG. 1 or FIG. 2 may be arranged in parallel to couple any one of m input signal paths to any one of *n* output signal paths. Illustratively, FIG. 3 depicts a talking path switching system in which 100 optical switches of the type shown in FIG. 1 are arranged in parallel in order to switch any one of 100 input signal paths M1 . . . M100 carrying digital information to any one of 100 output paths Q1 . . . Q100 carrying analog (e.g., voice) information. Each array 14 of each of the 100 optical switches contains 100 fibers as in FIG. 1. In general the $k^{th}$ fiber of each array is coupled through a photodetector 20·*k* to a digital-to-analog converter 22·*k* from which the analog signal is derived before it reaches the $k^{th}$ output signal path Q*k*. There is a fan-in of one line from all of the gates (i.e., detector-converter combinations) to each output signal path.

Although the system shown in FIG. 3 is adapted to handle pulses at a 50 K-bit rote, as mentioned previously, without significant redesign the same system can be modified to handle much higher bit rates (e.g., a 250 K-bit rate) by utilizing fewer outputs per switch. In addition to having the 100 optical switches connected in parallel, the system of FIG. 3 utilizes part of the optical input pulse S3 for two purposes: (1) to trigger ramp generator 26 as in FIG. 1, and (2) to signal a central processing unit (CPU) 40 that an incoming signal is on a particular input path. The latter signal is derived from the output of photodetector 24. In operation, the CPU 40 biases each differential discriminator 28 at a threshold level that makes it generate pulse S5 at a predetermined time in order to select a predetermined output signal path. The bias generated by the CPU is suitably quantized so that one output signal path is unambiguously selected. That is, the quantized bias effectively quantizes the threshold levels at which the differential discriminator 28 generates the gating pulses S5. This type of triggering effectively quantizes the opening times of the gates (i.e., photodetector-converter combinations) at the output of the organ fiber arrays 14. The CPU, which typically includes a computer, is programmed so that it will not bias two gates to the same value at the same time; i.e., so that two input signal paths will not be simultaneously connected to the same output signal path.

Note that no synchronization between the input and output for each switch is needed aside from that automatically introduced by the fibers of the organ arrays 14. Only anti-synchronization between lines is utilized so that two input signal paths will not be connected simultaneously to the same output signal path. As mentioned above, the CPU is programmed to effect this result and thereby avoid interference between two input signals.

Note also that, as with the switch of FIG. 1, only 20 percent of the cycle time for the 50 K-bit signals has been utilized in this system. Consequently, if time multiplexing is introduced among, for example, sets of five input signal paths, one set of five photodectors 20 and converters 22 can be made to handle five input signal paths, thereby reducing the number of photodetectors and converters required. This type of multiplexing might be done, for example, in the analog-to-digital converter (not shown) at the input which is used to generate the digital pulses S1. In this type of arrangement, five optical fibers would fan-in to each photodetector 20. In this manner a trade-off can be made between the number of optical switches and the amount of multiplexing in a given system. In a similar fashion, if time multiplexing is introduced among sets of, say, five input paths connected to switches of the type shown in FIG. 2, previously described, or FIG. 4 described next, then, one set of five optical gates 19 can be made to handle five input signal paths, thereby reducing the number of optical gates 19 required. Five fibers would fan into each optical gate 19. Similar trade-offs result.

Figure 4:
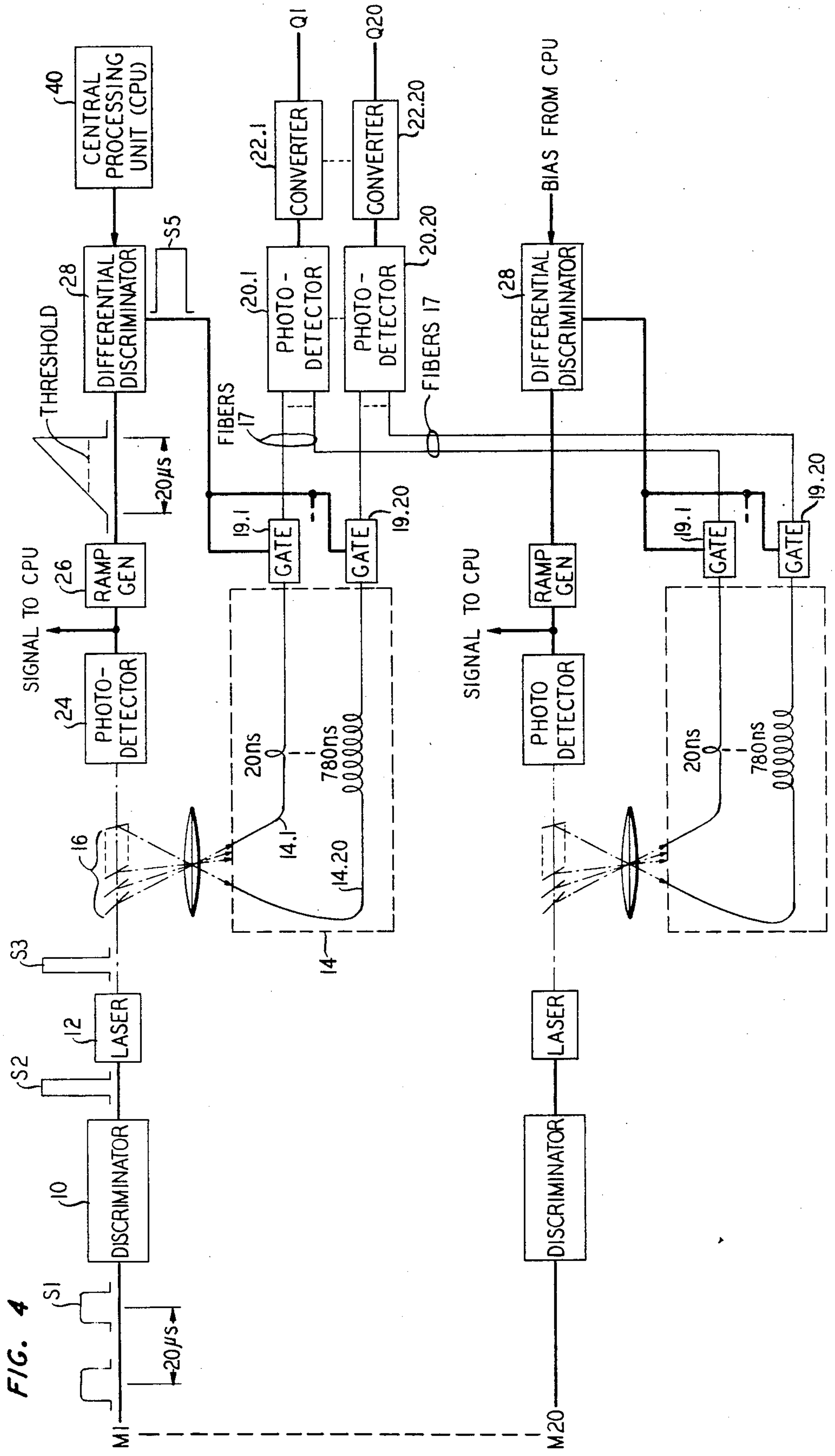
FIG. 4 is a block diagram of an arrangement of optical switches (of the type depicted in FIG. 2) adapted to switch any one of $m$ input signal paths to any one of $n$ output signal paths.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, FIG. 4 depicts an alternative switching system utilizing optical switches of the type depicted in FIG. 2 for switching any one of 20 input signal paths carrying digital information to any one of 20 output signal paths carrying analog information. Analogous to the system of FIG. 3, 20 optical switches are connected in parallel between the 20 input signal paths M1 . . . M20 and the 20 output signal paths Q1 . . . Q20. Each array 14 of each switch contains 20 fibers each of which is coupled to a separate optical gate 19 (or all of the fibers may be coupled to a unitary gate, not shown). In general, the $k^{th}$ gate 19·*k* of each array is connected to a single photodetector 20·*k* in series with an optional converter 22·*k* which in turn is connected to the $k^{th}$ output signal path Q*k*. This arrangement, therefore, has the advantage that it utilizes only one photodetector and one converter per output signal path. In addition, the smaller amount of multiplexing (i.e., smaller number of fibers) in each organ array 14 makes it possible to do more time multiplexing in this system than in the one depicted in FIG. 3, thereby reducing the number of switches required by a larger factor.

Although the foregoing embodiments of our invention were described with respect to analog signals appearing on the output signal paths, it would be apparent to one skilled in the art that the output paths could just as well carry digital information, in which case the converters 22 would be omitted. Moreover, the switches and systems described could also be utilized to switch analog signals in the form of short pulses (i.e., PAM) inasmuch as amplitude information is preserved by the optical switches. In the latter case, however, the initial discriminators 10 as well as the converters 22 would not be utilized. Finally, in a PCM optical communication system, where the pulses S1 are already optical pulses, the laser 12 may be eliminated if amplification or reshaping of the pulses is not required. In such an optical system if the output paths are optical (e.g., optical waveguides) rather tha electrical (e.g., subscriber wires), then (1) the photodetectors 20 of FIGS. 1 and 3 may be used to drive lasers (not shown) to generate optical pulses (converters 22 being omitted) or (2) the outputs of gates 19 of FIGS. 2 and 4 may be coupled directly to such waveguides (detectors 20 and converters 22 both being omitted).

What is claimed is:

1. An optical switch for connecting an input signal path carrying information in the form of pulses to a predetermined one of a plurality *n* of output signal paths, comprising:

generating means for producing from each of said pulses a plurality of optical sub-pulses propagating along spatially separate optical paths, a first array of n optical fibers each having a different length and the difference in length between functionally adjacent fibers being uniform, one end of each of said fibers being terminated in an input plane and the opposite end of each of said fibers being terminated in an output plane, means for coupling each of said optical subpulses into a separate one of said fibers at said input plane, each of said optical sub-pulses thereby experiencing a different time delay in propagating from said input plane to said output plane, gating means disposed between the output plane of said first array and said output signal paths, said gating means being normally in an off-state which prevents transmission from said input signal path to said output signal paths, and timing means for causing said gating means to switch to an on-state when a predetermined one of said delayed optical sub-pulses reaches said gating means, thereby to permit said predetermined sub-pulse to be transmitted to a predetermined one of said output signal paths.

2. The switch of claim 1 including delay compensation means disposed between said output plane of said first array and said output paths for making the total time delay for each path between said input path and said output paths nearly equal to one another.

3. The switch of claim 2 wherein said delay compensation means comprises a second array of *n* optical fibers each having a different length and the difference in length between functionally adjacent fibers being uniform, the fibers of said second array being optically coupled to the fibers of said first array at said output plane so that said total time delays are made nearly equal to one another.

4. The switch of claim 1 wherein:

said generating means comprises a plurality of beam splitters arranged in tandem in the path of said pulses and oriented to produce said plurality of optical sub-pulses along said spatially separate optical paths, and said coupling means includes lens means having a characteristic focal length, said coupling means being positioned to receive said plurality of sub-pulses and to focus each of said sub-pulses into a separate one of said fibers.

5. The switch of claim 1 wherein:

said input signal path carries digital information and said output signal paths carry analog information, and said gating means includes digital-to-analog converter means responsive to said timing means.

6. The switch of claim 1 wherein:

said gating means includes photodetector means responsive to said timing means for converting said optical sub-pulses received from said first array to electrical pulses on a preselected output path.

7. The switch of claim 6 wherein said timing means includes:

a differential discriminator having an electrical output connected to said gating means and two electrical inputs, a variable voltage bias source connected to one of said inputs for establishing predetermined threshold levels in said discriminator, and a ramp generator responsive to said pulses on said input signal path for generating a ramp voltage which is coupled to the other input of said discriminator.

8. The switch of claim 1 wherein:

said gating means includes optical gate means responsive to said timing means for transmitting selected ones Of said delayed optical sub-pulses received from said first array, and said switch also includes photodetector means for converting said selected ones of said optical sub-pulses to electrical pulses on a preselected output path.

9. The switch of claim 8 wherein said timing means includes:

a differential discriminator having an electrical output connected to said gating means and two electrical inputs, a variable voltage bias source connected to one of said inputs for establishing predetermined threshold levels in said discriminator, and a ramp generator responsive to said pulses on said input signal path for generating a ramp voltage which is coupled to the other input of said discriminator.

10. The switch of claim 4 wherein said information pulses on said input signal path are electrical pulses which carry information in PCM form, in combination with:

a discriminator-amplifier for regenerating said electrical pulses, said generating means includes a laser for producing optical pulses in response to said regenerated pulses, said optical pulses being coupled to said beam splitters.

11. An optical switching system for switching a pulsed input signal appearing on any one of *m* input signal paths to any one of *n* output signal paths comprising:

a plurality *m* of optical switches of the type defined by claim 1 connected to separate ones of said *m* input signal paths, in each first array of each of said switches the $k^{th}$ fiber being coupled to the $k^{th}$ output signal path, $1 \leq k \leq n$, and a central processing unit responsive to an input pulse on any one of said $m$ input paths for controlling said timing means so that no more than one input signal path is connected to a particular output signal path at the same time.

* * * * *